United States Patent [19]
Johnson

[11] 4,090,568
[45] May 23, 1978

[54] VINE HARVESTER FOR USE ON WET AND SLOPING GROUND

[75] Inventor: Howard B. Johnson, Woodland, Calif.

[73] Assignee: Martha Willis Button, Winters, Calif.

[21] Appl. No.: 713,561

[22] Filed: Aug. 11, 1976

[51] Int. Cl.² ............................................ A01D 27/00
[52] U.S. Cl. .................................... 171/27; 56/327 R
[58] Field of Search ..................... 56/1, 327 R, 7, 330; 171/14, 15, 26–39

[56] References Cited

U.S. PATENT DOCUMENTS

| | | | |
|---|---|---|---|
| 3,390,768 | 7/1968 | Button | 171/27 X |
| 3,433,003 | 3/1969 | Musgrove | 56/11.8 |
| 3,563,012 | 2/1971 | Strasel | 56/7 |
| 3,596,457 | 8/1971 | Van Tine | 56/330 |
| 3,990,217 | 11/1976 | Aoyama | 56/1 |

*Primary Examiner*—Russell R. Kinsey
*Attorney, Agent, or Firm*—Townsend and Townsend

[57] ABSTRACT

A lightweight harvester for a vine crop such as tomatoes planted in spaced-apart parallel rows on seed beds separated by depressed furrows. The harvester has a frame mounted on aligned, longitudinally spaced-apart flotation wheels which are positioned so that they ride on top of the seed bed during harvesting operations. The frame mounts vine pickup, handling and fruit separating mechanisms and includes a knife, aligned with the flotation wheels, for severing the vines from their roots forward of the wheels so that the wheels ride over a relatively smooth seed bed. An outrigger is secured to the frame, extends laterally therefrom and at its outer end mounts a stabilizing wheel which is spaced from the flotation wheels so that it rides in a furrow during harvesting operations. The axis of the stabilizing wheel can be raised or lowered to maintain the harvester in a laterally horizontal inclination when the ground slopes transversely to the seed beds. The outrigger is removable and the frame and equipment mounted thereon have an overall cross-section of no more than about 7 foot in height and width so that the harvester can be placed inside standard 8 foot by 8 foot shipping containers for shipment and ocean transportation.

16 Claims, 4 Drawing Figures

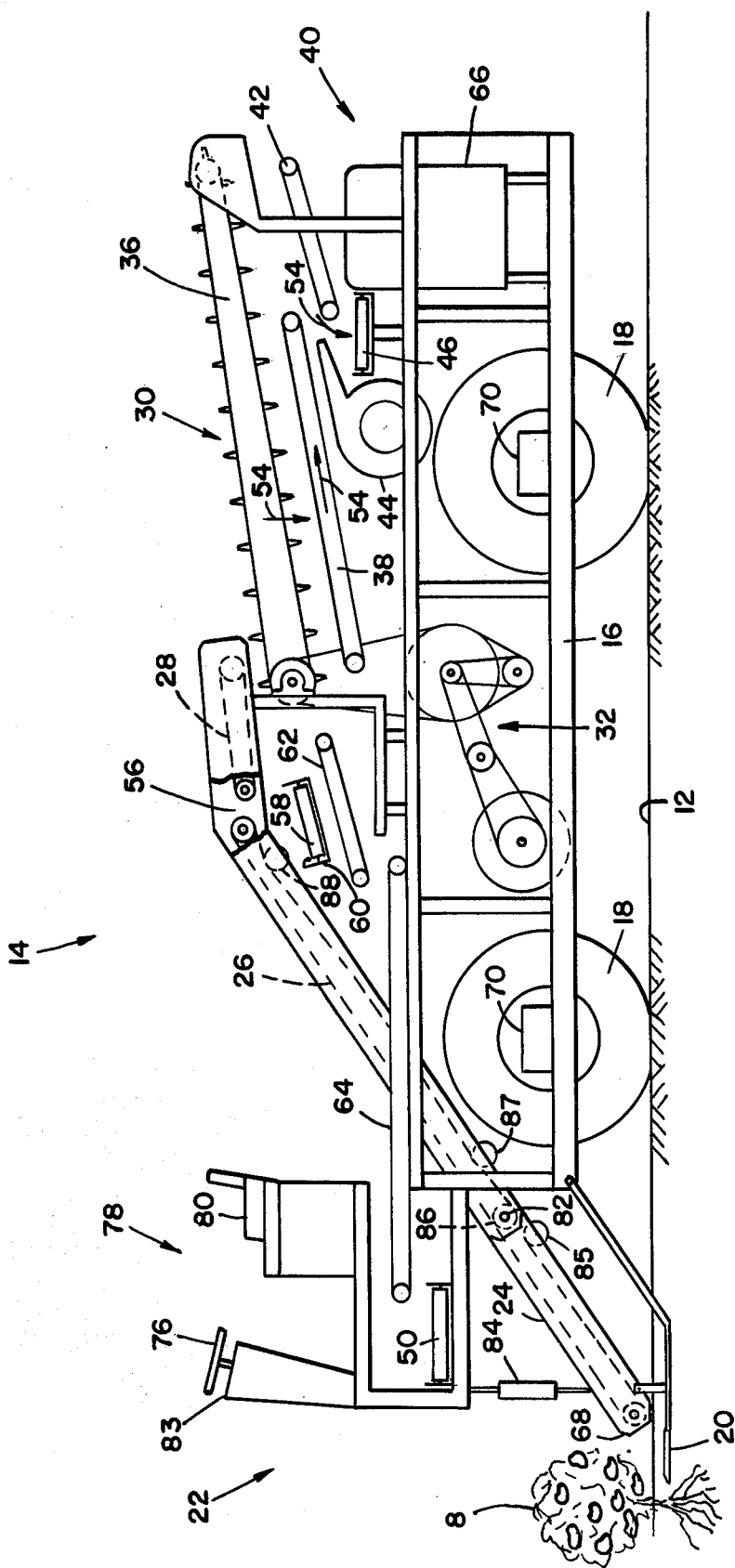
FIG_1

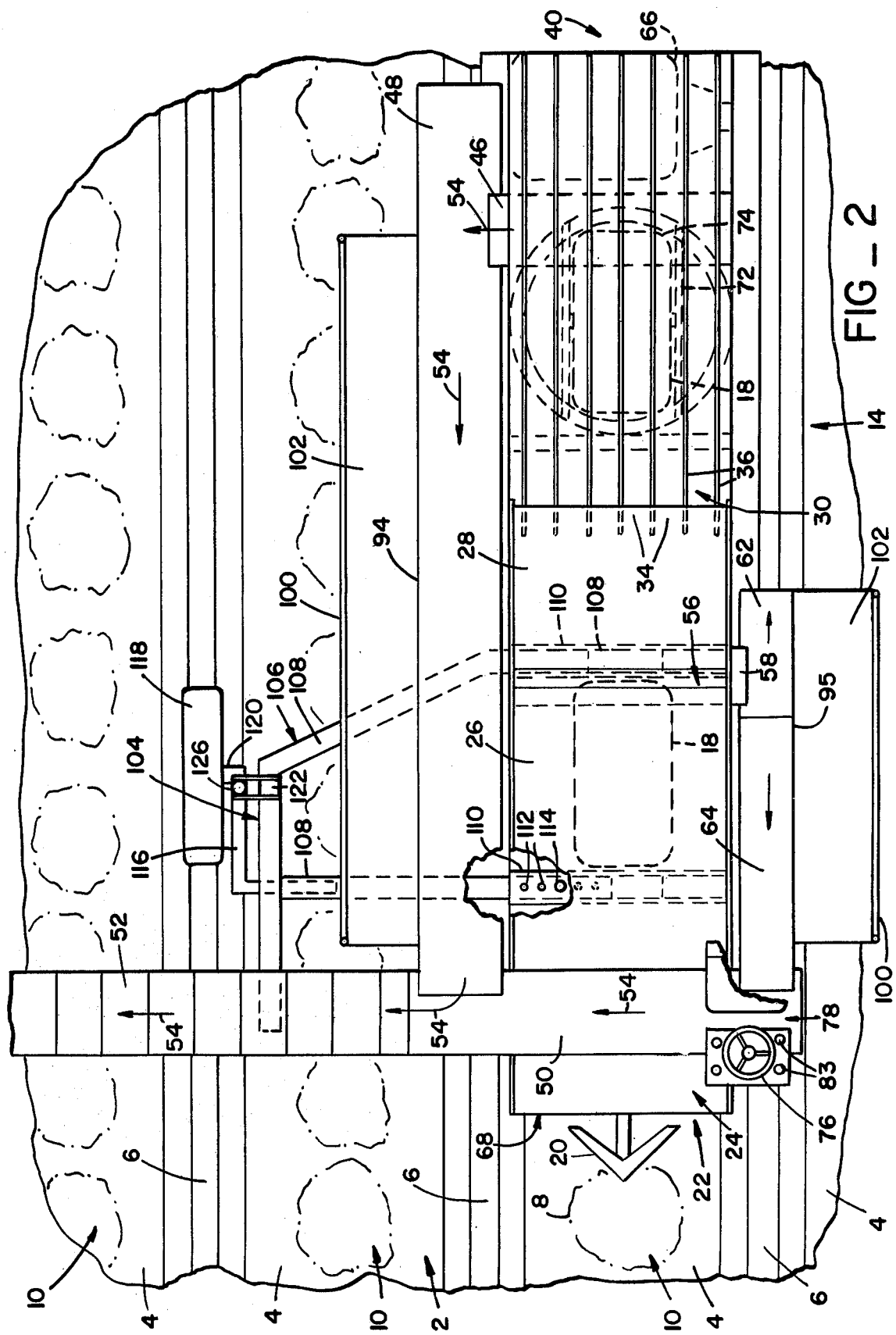

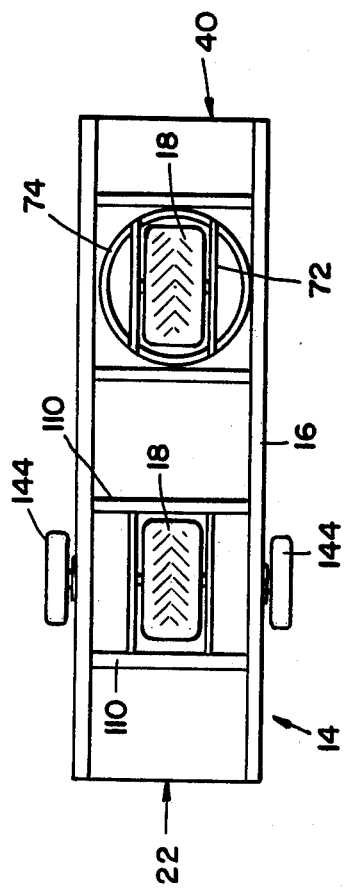
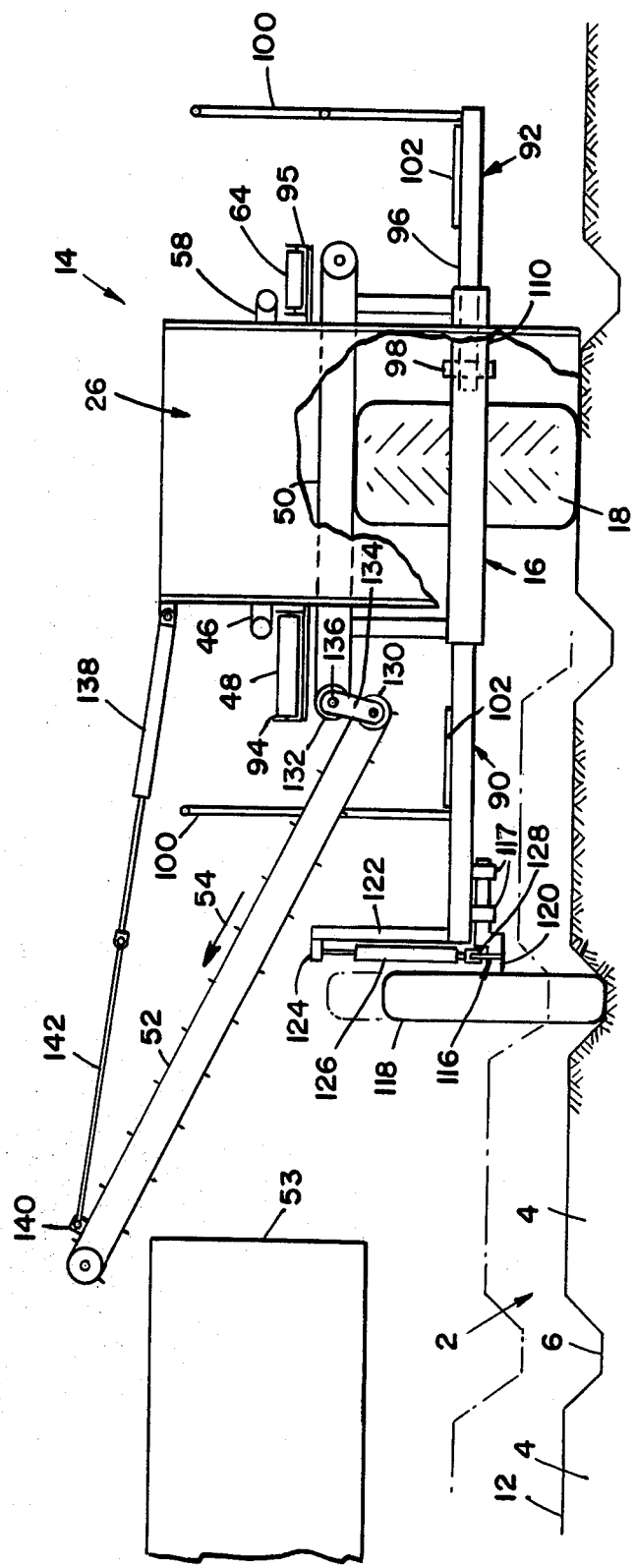

VINE HARVESTER FOR USE ON WET AND SLOPING GROUND

BACKGROUND OF THE INVENTION

The present invention relates to vine fruit harvesters such as tomato harvesters. Tomato harvesters as such are well known. One harvester presently in wide use is described in U.S. Pat. Nos. 3,193,020; 3,390,768.and 3,437,151 All prior art tomato harvesters generally provide a frame which mounts vine and fruit pickup, separating and handling equipment. The frame is carried by four conventionally arranged wheels which ride in furrows between seed beds.

Characteristically, tomato harvesters of the type disclosed in the referenced U.S. Patent have a high capacity, they may harvest as much as 60 tons of tomatoes an hour, and they are ideally suited for the geographic and climatic conditions found in many commercial tomato growing areas such as the central valleys of California, for example. There, tomatoes are grown in flat fields and the climatic conditions are such that during the tomato harvesting season no rainfall is encountered. Consequently, field irrigation can be controlled so that the furrows in which the wheels of the harvester operate are dry at harvest time. If the furrows were wet and muddy, serious problems can be encountered because the wet ground is often incapable of supporting the substantial weight of the harvesters.

There are areas, however, where tomatoes and similar vine crops are commercially grown which have neither the geographic nor the climatic conditions found in such areas as the central valleys of California. In many areas, such as the East Coast of the United States or certain Mediterranean countries, the ground is frequently inclined. Moreover, these areas experience summer rain so that the furrows, where rain water collects, become muddy and incapable of supporting the heavy weight of prior art tomato harvesters. Since tomato harvesters must be in an essentially horizontal lateral position, that is in a horizontal position in the direction transverse to the travel direction of the harvester, to prevent an undesired transverse rolling of tomatoes thereon and a resulting malfunctioning of the harvester, prior art harvesters are ill-equipped for use on ground with even relatively minor slopes. Moreover, the harvesters cannot be operated during or immediately following rainfall which greatly limits their usefulness in reasons where summer rainfall is encountered.

The relatively large size of prior art tomato harvester caused at least in part by their conventional four-wheel construction, with the wheel spacing dictated by the distance between adjacent seed bed (normally 5 to 6 feet), makes their shipment from the factory to the user expensive. Shipping expenses were particularly severe for overseas shipment since prior art harvesters were normally too bulky for shipment within standardized 8 foot by 8 foot ocean shipping containers.

There is, therefore, presently a need for a vine crop harvester capable of operating both on sloping and on wet fields. Furthermore, such a harvester should ideally be dimensioned so that it can be shipped in standard shipping costs for transporting the hargester from the manufacturer to the user.

SUMMARY OF THE INVENTION

The present invention provides a lightweight vine fruit harvester which is dimensioned to allow its shipment in standard shipping containers and which is constructed so that it can be used on sloping grounds as well as in wet fields. In its broader aspects the harvester of the present invention comprises a frame which mounts vine handling means and fruit separating means as well as means such as a flat blade or knife for severing the vines from their roots. The frame is supported on a pair of aligned, weight-carrying wheels which are in alignment with the vine severing blade. The weight-carrying wheels trail the blade during the harvesting operations and they are positioned so that they roll along the top of the seed bed from which the vines have just been cleared.

Since the seed bed top is the driest portion of a field during rainfall, that is, since rain water drains into the furrows separating the seed beds, the muddy condition found in the furrows during wet weather is avoided. Thus, the danger that the weight-carrying wheels of the harvester sink into the mud or become stuck is substantially reduced or eliminated. To further reduce such danger the load-carrying wheels are constructed as flotation wheels, that is, as oversize pneumatic wheels having a width of as much as 20 inches to reduce the unit pressure between the wheel and the ground.

An outrigger is mounted to and extends laterally from the frame of the harvester, preferably adjacent the forward end thereof (in the direction of travel during harvesting operations). The outboard end of the outrigger mounts a stabilizing or balancing wheel which carries little load. It prevents the main frame supported by the weight-carrying wheels from tipping to the side. Means is provided for raising the axis of the stabilizing wheel relative to the frame so as to compensate for a ground slope transverse to the seed beds to thereby maintain the harvester laterally horizontal, that is, horizontal in the direction perpendicular to the travel direction during harvesting operations. In the preferred embodiment of the invention the balancing wheel is mounted to a crank arm which is rotatably secured to the outrigger. A hydraulic actuator is provided for rotating the crank arm to lower and raise the stabilizing wheel.

The frame of the harvester and equipment mounted thereto (excluding the outrigger) is dimensioned so that its height and width do not exceed approximately 7 feet. The harvester, together with the outrigger removed therefrom, can thus be placed inside a standard 8 foot by 8 foot shipping container for overland and ocean transport at relatively low cost. The outrigger is preferably telescopingly mounted to the frame so that the spacing between the frame and the stabilizing wheel can be adjusted to fit the seed bed spacing on a given field. In actual operation, the stabilizing wheel is normally positioned so that it rolls in a furrow to prevent it from damaging vines and fruit thereon which have not yet been harvested. However, if desired the outrigger can be extended so that the stabilizing wheel rolls on top of an already harvested seed bed. In this manner, excessively muddy conditions in the furrows, as during or after heavy rainfall, can be avoided.

To enable the stable storing of the harvester while the outrigger is removed, and to enable transport of the harvester (with the outrigger removed along flat surfaces, e.g. on highways) without taking up excessive width, the present invention contemplates the provision of a pair of idler wheels which are demountably secured to sides of the frame within the 7 foot overall width. These idler wheels, when mounted, fully stabilize the harvester so that it can be safely stored or driven on highways and the like. The outrigger is mounted for actual harvesting and while harvesting the idler wheels are normally removed to prevent them from interfering with the operation of the harvester.

It is apparent that the harvester of the present invention fills a void left by prior harvesters. Its relative low initial cost, including initial shipping charges to the user, make it attractive for use in even relatively small fields. Moreover, the harvester of the present invention for the first time provides a feasible vine fruit harvester for use on sloping and/or wet ground without encountering the heretofore common problems when operating harvesters under such conditions. Thus, the harvester of the present invention helps to economize a subtantial segment of the Agricultural Industry and thus will aid in man's efforts to overcome food shortages.

BRIEF DESCRIPTION OF THE DRAWINGS

FIG. 1 is a side elevational view of a tomato harvester constructed in accordance with the present invention;

FIG. 2 is a plan view of the harvester illustrated in FIG. 1;

FIG. 3 is a front elevation of the harvester illustrated in FIG. 1;

FIG. 4 is a plan view, on a reduced scale, similar to FIG. 2 but shows the harvester fitted with idler wheels for storage or highway transportation.

DESCRIPTION OF THE PREFERRED EMBODIMENTS

Referring to the drawings, a field 2 has previously been prepared to define a plurality of parallel seed beds 4 which are spaced-apart by depressed furrows 6. In a typical field prepared for the growing of tomatoes the spacing between adjacent seed beds is five or five and one-half feet and tomato vines 8 grow in vine rows 10 positioned at about the center of seed bed tops 12.

A tomato harvester 14 constructed in accordance with the present invention has a main frame 16 which is carried by weight-carrying wheels 18 and which mounts the vine and tomato gathering, handling and separating means. These means generally comprise a vine severing blade 20 at a forward end 22 of the harvester which is suitably mounted to the frame and which is normally disposed just beneath seed bed top 12 to sever the vines from their roots. The severed vines are gathered by an inclined vine elevator 24 at the forward end of the harvester and carried upwardly by a conventional link conveyor 26 or the like.

At the upper end of the link conveyor a relatively short, generally horizontal conveyor 28 transports the vines, and fruit attached thereto rearwardly and deposits them on a vine shaker 30. The shaker is of a conventional construction and is driven via an intermittent motion drive 32, such as the drive described in U.S. Pat. No. 3,721,132. The shaker moves the vines in a generally rearward direction, but imparts thereto a shaking motion which separates the tomatoes from the vines. The tomatoes drop downwardly through spaces 34 between bars 36 onto a transport belt 38 which transports the tomatoes rearwardly and slightly upwardly. Vines from which the fruit have been separated are discharged from the shaker bars at aft end 40 of the harvester onto the ground.

From the rearwardly running tomato transport belt tomatoes, and any debris which fell through shaker 30, are discharged onto a second rearwardly running and rearwardly inclined belt 42, the forward end of which is spaced some distance below first belt 38 so that tomatoes and debris drop from the first belt onto the second belt. A blower 44 blows debris such as leaves, sand, stems etc. rearwardly while the relatively heavy and dense tomatoes drop downwardly onto the belt 42, roll forwardly along the inclined belt and are discharged onto a cross belt 46. The second inclined belt discharges the debris onto the ground while the cross belt transports the tomatoes, substantially free of any debris, to a lateral sorting belt 48. The sorting belt runs in a forward direction and transports the tomatoes towards the forward end 22 of the harvester. From the sorting belt the tomatoes are discharged onto a forward cross belt 50 and from there onto an inclined elevator 52 which discharges the tomatoes into a receptacle or truck drawn alongside the harvester. For clarity the path of the tomatoes from shaker 30 to elevator 52 is indicated by a plurality of arrows 54.

Dirt clods which may be accidentally picked off as the harvester moves forward and loose tomatoes picked off the ground or separated from the vines as the vines are transported upwardly on vine elevator 24 are removed from the vines before the latter reach shaker 30 by spacing apart the upper end of the vine elevator from the adjacent end of horizontal conveyor 28 to define a gap 56 therebetween. A tilted cross conveyor 58 lies beneath gap 56 and receives loose tomatoes and dirt clods. The loose tomatoes roll side-ways on the tilted conveyor against sidewall 60 and both the loose tomatoes and the clods are discharged onto a rearwardly running and inclined separation belt 62. The separation belt has a sufficient slope so that tomatoes dropped onto it roll forwardly, against the movement of the belt, while the irregularly shaped dirt, rocks, etc. are transported rearwardly by the belt and discharged therefrom onto the ground.

The forwardly rolling tomatoes drop onto a second horizontal belt 64 which transports them in a forward direction and deposits them on forward cross belt 50. There, the loose tomatoes are recombined with tomatoes separated from the vines by shaker 30 and transported forwardly by sorting belt 48 for discharge onto elevator 52.

The fruit and vine transport and separation described in the preceding paragraphs is conventional. A power plant such as an internal combustion engine 66 drives the conveyors, transporting belts, blower, shaker, etc. via a hydraulic system such as a hydraulic pump, piping and hydraulic motors positioned at the required locations, or via mechanical transmission belts and the like. The detailed construction of such drive systems is well-known and within the purview of those skilled in the art and, therefore, not described herein. Furthermore, for clarity the vine and tomato transporting and separating components are generally illustrated in a schematic manner to show their location and general arrangement rather than details of their mechanical mounting to the frame. Again, such mounting is well within the purview of those skilled in art, and their detailed description, as well as illustration in the drawings has been deleted to simplify the specification and drawing and render them more easily understood.

As mentioned earlier, wheels 18 carrying substantially the full weight of the harvester and they are aligned with and trail vine cutoff blade 20 as well as a lower end 68 of vine elevator 24. Thus, during forward movements of the harvester, the weight-carrying wheels ride on top 12 of seed bed 4 and since the wheels trail the blade and the elevator they ride on a smooth and even surface. During rainfall water from the seed bed tops drains into furrows 6 so that the seed bed tops are relatively dry and mud-free. Thus, even during rainfall the weight-carrying wheels are prevented from sinking into the ground. A possible destination of the seed bed and a possible loss of the alignment of the cutoff blade and the lower end of the vine elevator with respect to the seed bed top, which in turn can adversely affect the operation of the harvester are thereby prevented.

To further minimize the penetration of the top surface of the seed beds by the weight-carrying wheels, the latter are constructed as "flotation wheels", that is wheels of substantial width. For a harvester having an overall maximum cross section of about 7 foot by 7 foot and a length of about 19 feet, so that it can be placed in a standard 20 foot long shipping container, and which has a weight in the vicinity of about six and a half tons, two flotation tires of a 40 inch diameter and an effective width of about 20 inches is sufficient to prevent such penetration.

The weight-carrying wheels 18 are also employed for propelling the harvester forward. For this purpose they are coupled to hydraulic motors 70 which are powered by internal combustion engine 66. One of the wheels, preferably the aft wheel, is steerable to effect a change in direction of the harvester's movement. The aft wheel is mounted to a frame 72 which is rotatable about a vertical axis along a circular guideway 74 mounted to frame 16 of the harvester. Steering, that is rotation of the aft drive wheel about a vertical axis is effected by turning a steering wheel 76 at operator's seat 68 mounted to the frame adjacent the forward end of the harvester and above forward cross belt 50. A suitable servo mechanism (not shown on the drawings) is provided to translate steering wheel rotation into corresponding rotations of the steered weight-carrying wheel 18. The operator's station 78 includes a seat 80 and controls 83 to selectively energize and operate the internal combustion engine, the vine and fruit transporting conveyors and belts and the drive for the weight-carrying wheels. Again, the construction of the controls is conventional, and is therefore, not further described herein.

Referring now specifically to FIG. 1, lower end 68 of vine elevator 24 must be vertically adjustable to control its spacing from seed bed top 12 and to control the relative depth of blade 20. The elevator is disposed beneath both forward cross belt 50 and the portion of frame 16 supporting the operator's station 78. Thus, the whole vine elevator cannot be adjusted vertically; instead, its lower end only is articulated and pivotable about a horizontal pivot shaft 82. A hydraulic actuator 84 is mounted to the portion of frame 16 supporting the cross belt and the operator seat and connected to lower end 68 of the vine elevator. By energizing the actuator the lower end can be raised or lowered as required by pivoting it about shaft 82. Tension rollers 85, 86, 87 and 88 are provided to maintain link conveyor 26 taut irrespective of the relative position of the lower elevator end with respect to the remainder thereof To accommodate the harvester within the earlier discussed general 7 foot by 7 foot maximum overall cross section, dirt separation and loose tomato belts 62 and 64 are relatively narrow. Platforms 90 and 92 must be provided on each side of the harvester alongside the sorting belt 48 and the loose tomato belt 64, respectively, to enable workmen to supervise the flow of tomatoes towards forward cross belt 50 and for removing green tomatoes, culls and/or debris all of which is discharged onto the ground. Since the platforms have to extend laterally past outer edges 94 and 95, respectively, of belts 48 and 64 the platform are demountably secured to the frame. For that purpose they include lateral bars 96 which are telescopingly received within tubular members 110 of frame 16 and demountably secured thereto as with removable pins or bolts 98. A conventional upright railing and runningboards 102 are conventionally secured to the upper side of the bars. Thus, during harvesting operations the workers' platforms are secured to the frame to support inspectors as the harvester moves along the rows of tomato vines. During storage or shipment the platforms are removed and separately stored or shipped to keep the harvester within the 7 foot by 7 foot overall cross sectional dimension.

To stabilize the harvester during harvesting operations that is to keep it from tipping sideways an outrigger 104 is provided. The outrigger comprises a generally A-shaped frame 106 which has a pair of spaced-apart beams 108. Tubular frame members extend across the width of the frame and their ends opposite the end which receives lateral platform bars 96 telescopingly receive beams 108 of the A-frame. Both the tubular members and the beams include a set of spaced-apart holes 112 to receive suitable locking pins or bolts 114 and thereby secure the beams to the frame of the harvester. The holes permit the lateral adjustment of the A-frame by aligning different holes.

A crank arm 116 is rotatable in journals 117 positioned at the outboard end of the outrigger and mounts a stabilizing wheel 118 on the free arm 120 thereof. An upright mounting post 122 is positioned adjacent the outboard end of the outrigger and has an outwardly extending bracket 124 adjacent the top of the post to which one end of a hydraulic cylinder actuator 126 is secured. The other end of the actuator is mounted to a second bracket 128 on crank arm 116. Upon energization of the actuator the crank arm is rotated in one or the other direction to raise or lower free arm 120 and to thereby raise or lower the axis of rotation of stabilizing wheel 118 with respect to frame 16 of the harvester. In this manner the harvester can be maintained laterally horizontal even though the field slopes in the lateral direction, that is in a direction perpendicular to seed beds 4 as illustrated in phantom lines in the FIG. 3, by simply raising or lowering the stabilizing wheel which in turn is accomplished by rotating crank arm 116 the desired amount. Once the harvester reaches its horizontal attitude hydraulic actuator 126 maintains the stabilizing wheel in the set position until a repositioning becomes necessary due to a change in the field's slope. The hydraulic actuator 126 is controlled and energized from operator station 78.

The stabilizing wheel, which carries a relatively minor portion of the total harvester weight, normally no more than a portion of the weight of the outrigger and the weight of elevator 52, is relatively narrow compared to the flotation wheels 18. Even under wet and muddy conditions this does not adversely affect the operation of the harvester. The lateral distance between the flotation and the stabilizing wheels is adjusted by moving beams 108 within tubular frame members 110 so that the stabilizing wheel is normally disposed in a furrow 6. As above-mentioned, the outrigger can also be adjusted so that the stabilizing wheel rolls on top of a seed bed.

The earlier described fruit elevator 52 for transferring separated tomatoes to a truck drawn alongside the harvester has a lower end 130 disposed beneath an end 132 of cross belt 50 and includes a generally upwardly extending mounting plate 134 which is journaled about a horizontal pivot shaft 136 secured to harvester frame 16. A hydraulic cylinder actuator 138 has one end pivotally secured to the harvester frame and another end secured to a bracket 140 extending from an upper portion of the elevator. An extension rod 142 is provided to link the bracket with the hydraulic actuator. By extending or retracting the hydraulic actuator the tomato elevator can be raised or lowered as necessary for depositing separated tomatoes on truck 53.

From the foregoing description the operation of the harvester should be fully apparent. To briefly summarize it, before a harvesting operation commences outrigger 104 is mounted to frame 16. Normally, its lateral extension is adjusted by selecting the proper holes 112 in beams 108 and tubular frame members 110 so that stabilizing wheel 118 is in a furrow while weight-carrying wheels 18 are centered on a seed bed 4; normally the spacing between the weight-carrying wheels and the stabilizing wheels is adjusted so that it is 1.5 times the lateral distance between adjoining seed beds. It will be noted that outrigger 104 can be mounted to either end of tubular members 110 for a right or left handed extension. Furthermore, if required, an outrigger can be mounted to each side of frame 16.

The worker's platform 90, 92 are mounted to the frame as above described and the operator actuates hydraulic cylinder 126 to raise or lower the stabilizing wheel to thereby horizontally level the harvester (in a direction perpendicular to its travel direction) for the harvesting operation. Such horizontal leveling is important to prevent the round tomatoes from rolling to one or the other side of the longitudinally oriented conveyors and transport belts which may interfere with the proper operation of the harvester.

After the initial adjustments the harvester is driven onto the field with vine cutoff blade 20 aligned with a vine row 10 on a seed bed 4. As the harvester proceeds forwardly the vines and tomatoes are picked up by vine elevator 24 so that the weight-carrying flotation wheels 18 ride on a relatively smooth surface which is free of vine growth. The picked up vines and tomatoes are separated and discharged to the ground and tomato elevator 52, respectively, in the above described fashion. Workmen positioned on platforms 90, 92 both monitor the operation of the fruit-vine separation and transport and remove undesired tomatoes from the tomato flow before it is deposited in truck 53. The machine operator monitors the progress of the harvester through the field and its horizontal alignment, and where necessary, adjust the latter by energizing hydraulic actuator 126 to raise or lower the stabilizing wheel 118.

At the end of a harvesting operation the harvester can be driven to a storage shed, for example, over public highways by removing the earlier discussed demountable components, namely the platforms 90, 92, outrigger 104, and tomator elevator 52 so that the maximum width of the harvester does not exceed approximately 7 feet. To stabilize the harvester for such travel, as well as during subsequent storage and/or shipment, a pair of idler wheels 144 (shown in FIG. 4) are demountably secured to frame 16. For example, the idler wheels may be rotatably mounted to flanges which in turn are bolted onto the frame. The idler wheels are thus also within the maximum 7 foot width of the harvester and they permit the latter to be driven over flat surfaces in a stable manner. For clarity the vine and fruit handling, separating and transporting means mounted to the frame of the harvester and illustrated in FIGS. 1 through 3 have been deleted from the reduced scale illustration of the mounting of the idler wheels in FIG. 4.

I claim:

1. Apparatus for harvesting fruit growing on vines planted in parallel rows on seed beds separated by depressed furrows comprising a frame, means mounted on the frame for collecting the fruit, and at least three wheels mounted on the frame for supporting the apparatus during movements thereof along the vine rows, at least, two of the wheels being weight-carrying wheels positioned on and connected to the frame, so that they trail each other in substantial alignment for supporting a major portion of the weight of the apparatus on the seed bed during harvesting operations, and at least one other wheel being a stabilizing wheel positioned on and connected to the frame so that it is disposed in a furrow during harvesting operations, the other wheel carrying a minor portion of the weight of the apparatus.

2. Apparatus according to claim 1 including means for demountably attaching the stabilizing wheel to the frame at a position laterally offset with respect to the weight carrying wheels.

3. Apparatus according to claim 2 including a pair of idler wheels removably mounted to each side of the frame for stabilizing the frame while the stabilizing wheel is detached therefrom.

4. Apparatus according to claim 1 wherein there are a plurality of aligned weight-carrying wheels which trail each other.

5. Apparatus according to claim 1 wherein the weight-carrying wheels have an effective width substantially greater than the effective width of the stabilizing wheel.

6. Apparatus according to claim 5 wherein the weight-carrying wheels have a width of at least about 20 inches.

7. Apparatus according to claim 1 including means for raising the stabilizing wheel with respect to the frame so that the frame can be maintained laterally horizontal during operations in which the seed beds are on ground which slopes generally transversely to the beds.

8. A lightweight vine-fruit harvester adapted for operation on wet or sloping fields growing space apart parallel rows of vines and for shipment in standardized shipping containers having an approximately 8 foot by 8 foot cross-section comprising:

a frame, vine handling and fruit separating means mounted on the frame and adapted to discharge separated fruit onto a fruit elevator and to discharge vines substantially free of fruit back onto the ground, the frame and the vine handling and fruit separating means having a combined overall width and height of no more than about 7 feet to permit them to be placed inside a standard shipping container for shipment thereof, means mounted on the frame for severing the vines from the ground when the apparatus moves along rows of planted vines, a plurality of flotation wheels mounted on the frame one behind the other in substantial alignment with the severing means so that the flotation wheels ride over the portion of the underlying ground from which vines have been severed, means mounted on the frame for driving at least one of the flotation wheels to propel the harvester, means mounted on the frame for rotating at least one of the flotation wheels about a horizontal axis to steer the harvester during movements thereof, an outrigger removably attached to the frame and extending transversely therefrom relative to the direction of travel of the harvester during harvesting operations, a stabilizing wheel mounted to the outrigger laterally spaced relative to the frame to prevent tipping of the frame, and means for adjusting the relative height of the stabilizing wheel with respect to the frame so as to maintain the frame substantially horizontal when moving over ground inclined transversely with respect to the vine rows.

9. Apparatus according to claim 8 wherein the vine handling and fruit separating means includes means for carrying vines and fruit from the severing means in a generally rearwardly direction centrally of the frame, means for separating the fruit from the vines adjacent a rearward end of the frame, and means for transporting separated fruit generally laterally of the frame towards a forward end thereof for discharge onto the elevator, the last mentioned means being permanently secured to the frame and having a lateral edge within the 7 foot width of the harvester.

10. Apparatus according to claim 9 including platform means extending parallel to the forward fruit transporting means for supporting workmen removing unwanted fruit before it reaches the elevator.

11. Apparatus according to claim 10 wherein the platform means extends beyond the lateral edge of the forward fruit transporting means and beyond said overall 7 foot width of the harvester, and means for positioning the platform means within said 7 foot overall harvester width during shipment and storage.

12. Apparatus according to claim 11 wherein the harvester comprises a forward fruit transporting means on each side of the frame and including a transverse fruit collecting belt positioned to receive fruit discharged by the forward fruit transporting means for depositing fruit onto the elevator.

13. Apparatus according to claim 8 wherein the outrigger includes a pair of parallel, spaced apart first members, wherein the frame includes a pair of hollow second members spaced apart to correspond to the spacing between the members, one of the first and second members being tubular and dimensioned and formed to telescopingly receive the other one of the members to permit adjustment of the lateral spacing between the stabilizing wheel and the frame by longitudinally moving the first and second members with respect to each other, and means for demountably securing the first and second members to each other so that the stabilizing wheel spacing can be adjusted for operation in fields of varying spacing between the vine rows.

14. Apparatus according to claim 8 wherein the stabilizing wheel is mounted on a crank arm, and including means for rotatably mounting the crank arm to the outrigger, and wherein the means for adjusting the height of the stabilizing wheel comprises means for rotating the crank arm relative to the outrigger means and for maintaining the crank arm in a fixed desired position for operation on a given slope.

15. Apparatus according to claim 8 including a pair of idler wheels, and means for removably mounting the idler wheels within the 7 foot overall harvester width for stabilizing the harvester when the outrigger is removed from the frame while permitting movement of the harvester over level surfaces.

16. Apparatus according to claim 8 including means for mounting the outrigger to either lateral side of the frame.

* * * * *